(12) United States Patent
Lundh et al.

(10) Patent No.: US 7,710,922 B2
(45) Date of Patent: May 4, 2010

(54) FLOW CONTROL AT CELL CHANGE FOR HIGH-SPEED DOWNLINK PACKET ACCESS

(75) Inventors: Peter Lundh, Skärholmen (SE); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1126 days.

(21) Appl. No.: 11/024,942

(22) Filed: Dec. 30, 2004

(65) Prior Publication Data

US 2006/0146749 A1 Jul. 6, 2006

(51) Int. Cl.
*H04W 4/00* (2009.01)
(52) U.S. Cl. .................. 370/331; 370/332; 370/333; 370/334; 370/335; 455/436; 455/439; 455/452.2
(58) Field of Classification Search ......... 370/310–350; 455/436, 439, 452.2
See application file for complete search history.

(56) References Cited

U.S. PATENT DOCUMENTS

| | | | |
|---|---|---|---|
| 2004/0027997 A1* | 2/2004 | Terry et al. | 370/276 |
| 2004/0184424 A1* | 9/2004 | Shibata et al. | 370/331 |
| 2005/0207374 A1* | 9/2005 | Petrovic et al. | 370/331 |
| 2007/0081492 A1* | 4/2007 | Petrovic et al. | 370/331 |

FOREIGN PATENT DOCUMENTS

EP 1 432 262 A1 6/2004

OTHER PUBLICATIONS

Tech Spec, 3GPP TR 25.935 v4, 1.0, "$3^{rd}$ Generation Partnership Project (3GPP); Technical Specification Group Radio Access Network; Radio Resource Management (RRM); Optimization for Iur and Iub (Release 4)", Mar. 2002.
Tech. Spec, 3GPP TS 25.425 V6.1.0, "$3^{rd}$ Generation Partnership Project; Technical Specification Group Radio Access Network; UTRAN Iur Interface User Plane Protocols for Common Transport Channel Data Streams" (Release 6), Mar. 2004.
Tech. Spec, 3GPP TS 25.435 V6.1.0, $3^{rd}$ Generation Partnership Project; Technical Specification Group Radio Access Network; UTRAN $1_{ub}$ Interface User Plane Protocols for Common Transport Channel Data Streams (Release 6), Mar. 2004.

(Continued)

*Primary Examiner*—Nghi H Ly
*Assistant Examiner*—Amancio Gonzalez
(74) *Attorney, Agent, or Firm*—Nixon & Vanderhye, P.C.

(57) ABSTRACT

A control node (26) of a radio access network participating in a cell change procedure is permitted to begin sending HS-DSCH data frames to a target radio base station (28) even before the control node knows a calculated capacity allocation for the target cell. Such pre-knowledge transmission of HS-DSCH data frames by the control node effectively reduces a control node (e.g., RNC) bitrate transmission gap which otherwise would occur had the control node waited to send the high-speed downlink shared channel (HS-DSCH) data frames after the control node had been informed of the calculated capacity allocation. The control node is permitted to begin sending the HS-DSCH data frames even prior to an activation time (AT), and typically just after a switch time (ST).

23 Claims, 7 Drawing Sheets

OTHER PUBLICATIONS

Tech. Spec, 3GPP TS 25.402 V6.0.0, "3$^{rd}$ Generation Partnership Project; Technical Specification Group Radio Access Network; Synchronisation in UTRAN Stage 2" (Release 6) Dec. 2003.
Tech. Spec, 3GPP TS 25.402 V6.0.0, "3$^{rd}$ Generation Partnership Project; Technical Specification Group Radio Access Network; UTRAN lub Interface NBAP Signalling" (Release 6) Sep. 2004.
3GPP TSG-RAN WG2 #44, R2-042103, "Enhancements to Serving HS-DSCH Cell Change", Source: Nokia, France, Oct. 4-5, 2004.
English translation of Chinese Office Action mailed Sep. 4, 2009 in Chinese Application 200580044604.5.

* cited by examiner

FLOW CONTROL AT CELL CHANGE FOR HIGH-SPEED DOWNLINK PACKET ACCESS

BACKGROUND

1. Field of the Invention

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

2. Related Art and Other Considerations

The Universal Mobile Telecommunications System (UMTS) is a third generation mobile communication system, which evolved from the Global System for Mobile Communications (GSM), and is intended to provide improved mobile communication services based Wideband Code Division Multiple Access (WCDMA) access technology. As wireless Internet services have become popular, various services require higher data rates and higher capacity. Although UMTS has been designed to support multi-media wireless services, the maximum data rate is not enough to satisfy the required quality of services. In a forum known as the Third Generation Partnership Project (3GPP), telecommunications suppliers propose and agree upon standards for third generation networks and UTRAN specifically, and investigate enhanced data rate and radio capacity.

One result of the forum's work is the High Speed Downlink Packet Access (HSDPA). The HSDPA system provides, e.g., a maximum data rate on the order of about 10 Mbps to improve the radio capacity in the downlink. HSDPA features a high speed channel (HSC) controller that functions, e.g., as a high speed scheduler by multiplexing user information for transmission over the entire HS-DSCH bandwidth in time-multiplexed intervals (called transmission time intervals (TTI)). Since HSDPA uses code multiplexing, several users can be scheduled at the same time.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources are shared between users using time multiplexing. A high speed-downlink shared channel is one example of shared channel transmission. One significant benefit of shared channel transmission is more efficient utilization of available code resources as compared to dedicated channels (DCH). Higher data rates may also be attained using higher order modulation, which is more bandwidth efficient than lower order modulation, when channel conditions are favorable.

Radio channel conditions experienced on different communication links typically vary significantly, both in time and between different positions in the cell. In traditional WCDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

For maximum cell throughput, radio resources may be scheduled to the communication link having the best instantaneous channel condition. Rapid channel dependent scheduling performed at the base station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

With HSDPA, the physical layer becomes more complex as an additional MAC protocol is introduced: the MAC-hs. On the network side, the MAC-hs protocol is implemented in the radio base station (RBS). The MAC-hs protocol contains the retransmission protocol, link adaptation, and channel dependent scheduling. The complexity increase with HSDPA is thus mainly related to the introduction of an intelligent Layer 2 protocol in the radio base station (RBS).

HSDPA generally has an algorithm for selecting the amount of power for the HS-DSCH and a downlink control channel known as the HS-SCCH. The HS-SCCH contains information which is sent to the mobile terminals so that the mobile terminals know if they have data to receive on the HS-PDSCh channel or not.

As mentioned above, HSDPA uses a fast Hybrid ARQ between a radio base station (RBS) and a mobile station (UE). Iub Flow Control is used between a radio network controller (RNC) and the RBS in order to ensure that a feasible amount of data (bits or bytes) is in the RBS priority queues. The amount of data in the queues is controlled by a flow control algorithm (FCA). If the RBS priority queues (PQs) are too lengthy these buffers (PQs) give too long delays. On the other hand, if the RBS priority queues (buffers) are too short, they become "dry" at a time when a user is suddenly scheduled in the transmission interval. Thus, the flow control algorithm (FCA) seeks to control the RBS priority queue flows in a way that the RBS priority queues become essentially stable.

The data in the priority queues is sent from a control node to a radio base station in protocol data units (PDUs). A number of PDUs may be included in each high-speed downlink shared channel (HS-DSCH) data frame.

In a HSDPA system there are generally two basic bottlenecks. One of the bottlenecks is on the downlink on the air-interface (Uu) between the mobile station and the radio base station node (RBS); the other bottleneck is on the downlink on the interface (Iub) between the radio base station node and the radio network controller node. Both of these bottlenecks are considered in the flow control algorithm. The available HS bandwidth over the Iub interface varies considerably. If too much HS traffic is allocated over Iub, frame losses and long delays degrades the HS packet data performance. The air interface scheduling of HS-DSCH Data Frames is controlled by RBS.

When the radio conditions for a HS-DSCH user begins to be poor in the source cell, the user is connected to a new cell (target cell) with better radio connection. Such can occur, for example, as a mobile station travels farther and farther from a radio base station which broadcasts in a "source" cell in which the mobile station has been receiving and sending transmissions, and approaches a new or "target" cell in which another radio base station is operative. The target cell may be served by the same or another radio base station. Since, from the perspective of the traveling mobile station, the radio conditions of the source cell decline and the radio conditions of the target cell improve, the radio access network must provide some means of handoff or handover of the mobile station from the source cell to the target cell, e.g., a cell change for the mobile station. On the downlink the cell change is necessary so that further data frames which continue the stream or media previously sent via the source cell can be sent via the target cell to the mobile station. In the specific case of a HSDPA cell change, HS-DSCH data frames are switched over from being sent to source cell to being sent to target cell.

The HSDPA cell change is a GSM-like hard handover. That is, at a given point of time (e.g., "Activation Time") the source cell RBS stops its transmission to the mobile station and the new (target) cell starts its transmissions to the mobile station. Soft Handover (SHO), which is generally employed for wideband CDMA (WCDMA) cannot be used for HS-DSCH. At a "switch time" which occurs before the activation time the radio controller node (e.g., control node) must stop sending high-speed downlink shared channel (HS-DSCH) data frames to the source radio base station for the source cell and instead reallocate the high-speed downlink shared channel (HS-DSCH) data frames to the target radio base station for the target cell.

During the HSDPA cell change procedure the data transmission speed might degrade for various reasons. A first reason is that data directed to the source cell may be lost at call change activation time (e.g., when the cell change takes effect on the air interface). Such can occur, for example, if in the source cell some protocol data units (PDUs) cannot be sent to the mobile station before the time of the cell change, with the result that these PDUs will be lost and must be retransmitted by RLC protocol. Another reason is that the target cell may not have PDUs to send to the mobile station. The challenge is to stop sending data for the mobile station via the source cell at an appropriate time (at the latest at the switch time) and to start sending data to the mobile station via the target cell in order to fill up the priority queue with an appropriate amount of data just before activation time.

What is needed, therefore, and an object herein provided, are apparatus, method(s), and technique(s) for providing HSDPA flow control in a way to minimize data transmission speed degradation during a HSDPA cell change.

SUMMARY

A cell change procedure is performed with respect to a mobile terminal utilizing a high-speed downlink shared channel (HS-DSCH) in radio access network. The radio access network comprises a source radio base station which serves a source cell (in which the mobile terminal has been receiving data frames on the HS-DSCH); a target radio base station which serves a target cell (into which the mobile terminal is moving or otherwise should anticipate receiving the data frames on a HS-DSCH in the immediate future); and, one or more control nodes which control one or both of the source radio base station and the target radio base station. At a switch time (ST) of a switch operation of the cell change procedure, the high-speed downlink shared channel (HS-DSCH) data frames destined for a mobile terminal are reallocated from the source radio base station to the target radio base station. The switch time (ST) is established by the control node, and occurs at a switch time offset (STO) relative to an activation time (AT). The activation time (AT) is the time at which time in the cell change procedure at which the cell change procedure becomes effective on an air interface, i.e. source radio base station becomes inactive, the target radio base station becomes active, and the mobile terminal switches over on the air interface from the source radio base station to the target radio base station.

Both the source radio base station and the target radio base station have data flow controllers and monitors for the carrier quality (CQI) of the high-speed downlink shared channel (HS-DSCH). The flow controllers supervise the high-speed downlink packet access activities of the respective radio base stations, and as such manage a priority queue maintained at the radio base station which stores data which is to be sent on the high-speed downlink shared channel (HS-DSCH) over the air interface to the mobile terminal. In addition, knowing from the monitor the carrier quality of the HS-DSCH, the flow controller periodically sends to the control node messages which authorize the control node to send more HS-DSCH data frames to the radio base station.

The mobile terminal reports carrier quality indicator (CQI) to the radio base station in charge of the cell, and such report is maintained by the CQI monitor. The carrier quality indicator (CQI), together with an expression(s) of capabilities of the mobile terminal, is translated to a bitrate. The bitrate is then further reduced if needed in the flow controller of the radio base station, which results in generation of capacity allocation control frames which are sent to the control node regularly and/or per need bases, e.g. at urgent transitions. The authorizing messages include a capacity allocation which can be expressed in various ways, such as in terms of either bitrate or credits, for example. In response to these authorizing messages, the control node sends further HS-DSCH frames to the radio base station.

Until now it has been expected that the control node must wait to send HS-DSCH data frames to the target radio base station until after the target radio base station has had an opportunity to monitor the quality (CQI) of the particular HS-DSCH carrier utilized in the target call by the mobile terminal, and until after the target radio base station has provided a measured or calculated capacity allocation (based on the CQI) to the control node. Since the capacity allocation is indicative of the bitrate that can be operative for the mobile terminal on the HS-DSCH in the target cell, it seemed reasonable that the control node should wait to be informed of such capacity allocation determination prior to sending HS-DSCH data frames to the priority queue at the target radio base station.

In departing from previous expectation, and in accordance with an example method of operation, the control node is permitted to begin sending the HS-DSCH data frames to the target radio base station even before the control node knows a calculated capacity allocation for the target cell. Such pre-knowledge transmission of HS-DSCH data frames by the control node effectively reduces a control node (e.g., RNC) bitrate transmission gap which otherwise would occur had the control node waited to send the high-speed downlink shared channel (HS-DSCH) data frames after the control node had been informed of the calculated capacity allocation. In fact, the control node is permitted to begin sending the HS-DSCH data frames even prior to the activation time (AT), and typically just after the switch time (ST).

In one example mode of operation, the pre-knowledge sending of the HS-DSCH data frames to the target radio base station is performed, not based upon or in accordance with a calculated capacity allocation (which is not yet known or available), but instead with a presumptive capacity allocation for the target cell.

In accordance with one example implementation, there may be two types of presumptive capacity allocations. A first type of presumptive capacity allocation is an initial capacity allocation sent from the target radio base station to the control node and configured to evoke transmission of a first HS-DSCH data frame from the control node to the target radio base station. For example, the initial capacity allocation can be sent from the target radio base station to the control node in a NBAP RL Reconfiguration READY message. The initial capacity allocation causes the first HS-DSCH data frame to be sent essentially immediately after the switch time (ST) (assuming data is available in the control node).

A second type of presumptive capacity allocation is a cell change capacity allocation. A message which includes the presumptive capacity allocation is sent to the control node from the target radio base station upon receipt by the target radio base station of the first HS-DSCH data frame evoked by the initial capacity allocation. In an example implementation, the presumptive capacity allocation is related to an (e.g., estimated or approximate) acceptable carrier quality indicator value at a cell border for the cell change.

Upon receiving the second presumptive capacity allocation from the target radio base station, the control node sends to the target radio base station further high-speed downlink shared channel (HS-DSCH) data frames, with these further high-speed downlink shared channel (HS-DSCH) data frames being sent in accordance with the second presumptive capacity allocation.

After the target radio base station has had the opportunity to monitor the carrier quality of the HS-DSCH channel, the target radio base station ascertains the carrier quality indicator (CQI) from which the flow controller develops a third type of capacity allocation, i.e., the calculated capacity allocation. The target radio base station sends this third or calculated capacity allocation to the control node, and thereafter the control node sends to the target radio base station yet further high-speed downlink shared channel (HS-DSCH) data frames in accordance with the third capacity allocation. Periodically and on a need basis, the calculated capacity allocation is sent by the target radio base station to the control node since, e.g., the carrier quality indicator (CQI) may change or other factors involved in determining the calculated capacity allocation may change.

Another novel aspect is the radio base station node which serves a cell which is target cell at the beginning of a cell change procedure. The target radio base station comprises a transceiver for communicating with the mobile terminal on a high-speed downlink shared channel (HS-DSCH) carrier over an air interface; a carrier monitor which determines the carrier quality indicator for the high-speed downlink shared channel (HS-DSCH) carrier; and, the flow controller. As indicated above, even before the carrier quality indicator is available, the flow controller generates a presumptive capacity allocation message for enabling a control node of the radio access network to send a high-speed downlink shared channel (HS-DSCH) data frame(s) to the target radio base station node.

In an example implementation, in conjunction with a NBAP RL Reconfiguration the flow controller of the radio base station sends a first presumptive capacity allocation message and includes an initial capacity allocation which is configured to authorize the control node to send a first high-speed downlink shared channel (HS-DSCH) data frame to the radio base station. Upon receipt of the first high-speed downlink shared channel (HS-DSCH) data frame from the control node, the flow controller further sends a second presumptive capacity allocation message which includes a second presumptive capacity allocation, e.g., a cell change capacity allocation. Preferably this cell change capacity allocation is related to an acceptable carrier quality indicator value at a cell border for the cell change.

Thereafter, when the carrier quality indicator is available, the radio base station sends a calculated capacity allocation to the control node, the calculated capacity allocation being dependent upon the carrier quality indicator for the high-speed downlink shared channel carrier in the target cell.

Another novel aspect is the control node which, in conjunction with the cell change procedure for a mobile terminal, begins to send high-speed downlink shared channel (HS-DSCH) data frames to a target radio base station before the control node knows a calculated capacity allocation for the target cell. The control node responds to the initial capacity allocation by sending a first HS-DSCH data frame to the target radio base station essentially immediately after switch time (ST). Thereafter, upon receipt of the cell change capacity allocation from the target radio base station, the control node sends further HS-DSCH data frames to the target radio base station in accordance with the specified cell change capacity allocation. After the target radio base station has had the opportunity to monitor the carrier quality indicator (CQI) for the HS-DSCH carrier and to report a calculated capacity allocation to the control node, the control node sends yet further HS-DSCH data frames to the target radio base station in accordance with the calculated capacity allocation.

Another novel aspect concerns an optional and separate feature of the source radio base station, e.g., the radio base station which serves a cell which is a source cell at an onset (e.g., the beginning) of the cell change procedure involving the mobile terminal, and a method of operation engendered thereby. The source radio base station comprises a transceiver for communicating with the mobile terminal on a high-speed downlink shared channel (HS-DSCH) carrier over the air interface; a flow controller which at least partially controls a flow of the high-speed downlink shared channel (HS-DSCH) data frames over the air interface to the mobile terminal; and, a queue which stores data to be included in the high-speed downlink shared channel (HS-DSCH) data frames that are to be sent over the air interface to the mobile terminal. The flow controller is arranged to make an assessment of an amount of the data in the queue relative to an activation time of the cell change procedure, and (in accordance with the assessment) to send information to the control node to cause the control node to decrease sending of high-speed downlink shared channel (HS-DSCH) data frames to the radio base station. The assessment performed by the flow controller of the source radio base station can further involve an assessment of a quality of transmission of the high-speed downlink shared channel (HS-DSCH) data frames on the air interface.

Thus, the flow controller of the source radio base station, knowing in advance the activation time (AT), essentially determines whether the receipt of more data for the HS-DSCH in its priority queue would risk the possibility that data priority queue may not be transmitted over the air interface to the mobile terminal before the activation time (AT) for the cell change. In such case, for example, the information sent to the control node of the radio access network can essentially halt the control node from sending further high-speed downlink shared channel (HS-DSCH) data frames to the source radio base station, even before the switch time (ST) at which routing of HS-DSCH data frames to the source radio base station would otherwise cease.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual blocks are shown in the figures.

Figure 1:
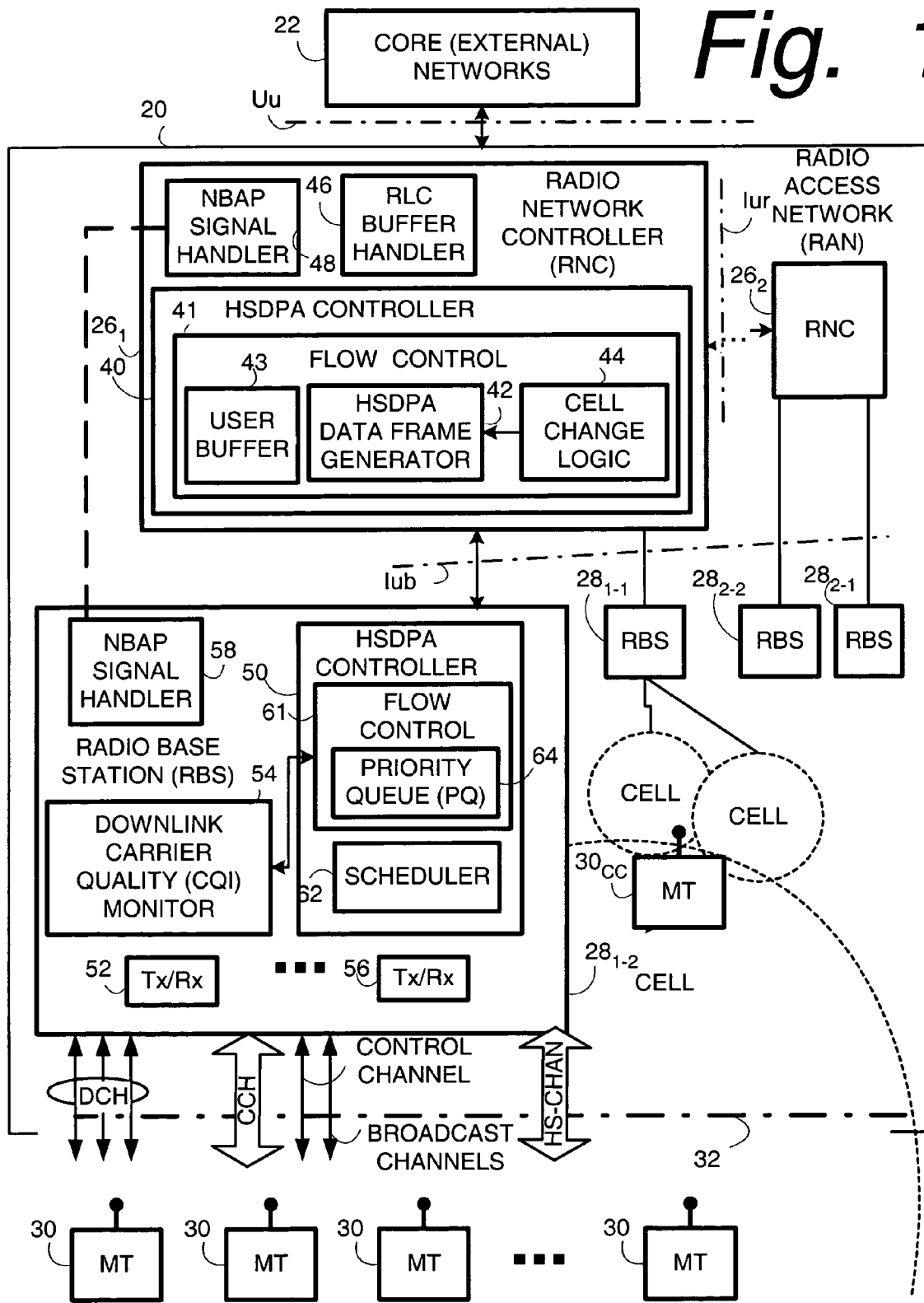
FIG. 1 is schematic view of an example embodiment of a telecommunications system which facilitates flow control during a cell change for High Speed Downlink Packet Access (HSDPA).

FIG. 1 illustrates an example, non-limiting telecommunications system wherein a radio access network 20 is connected to one or more external (e.g., core) networks 22. The external networks 22 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a General Packet Radio Service (GPRS) Service (SGSN) node working in conjunction with a gateway GRPS support node (GGSN).

Each of the core network service nodes connects to the radio access network (RAN) 20 over a suitable interface. In the particular, non-limiting example shown in FIG. 1, the radio access network (RAN) 20 is a UMTS Terrestrial Radio Access Network (UTRAN) and the interface with the external network is over the Iu interface. The radio access network (RAN) 20 includes one or more radio network controllers (RNCs) 26 and one or more radio base stations (RBS) 28. For sake of simplicity, the radio access network (RAN) 20 of FIG. 1 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node.

It should be understood that at least one and likely more of the RNCs of the radio access network have an interface (over the Iu interface) to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. For base station $28_{1-1}$, for example, two cells served thereby are represented by respective small circles. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

For sake of simplification, the cell of base station $28_{1-2}$ is depicted as a larger semicircle into which a cell changing-mobile terminal $30_{CC}$ is shown as entering (as depicted by arrow 31). Other mobile stations 30 are also shown as currently being served by the cell of radio base stations (RBS) $28_{1-2}$.

As shown in FIG. 1, the mobile terminals (MT) 30 communicate with one or more cells or one or more base stations (BS) 28 over a radio or air interface 32. In differing implementations, the mobile terminals (MT) 30 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using WCDMA spreading codes. Of course, other access methods may be employed.

FIG. 1 further illustrates in simplified form that different types of channels may exist between one of the base stations 28 and mobile terminals (MT) 30 for transport of control and user data across a radio or air interface 32. For example, in the forward or downlink direction, there are several types of broadcast channels, one or more control channels, one or more common traffic channels (CCH), dedicated traffic channels (DPCH), and a high-speed shared channel which now is of particular interest. The high-speed shared channel (HS-channel) may be a high-speed downlink shared channel (HS-DSCH) or a high-speed shared control channel (HS-SCCH). The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

The control node 26 configures the cell to support HSDPA. Thereafter it is up to the radio base station 28 to perform other activities, such as (for example) to allocate power and the amount of codes needed at respective TTI transmissions.

As shown in FIG. 1, control node 26 comprises a HSDPA controller 40 which, possibly among other things, governs allocation and utilization of the high-speed downlink shared channel (HS-DSCH). The HSDPA controller 40 may be included with or separate from a node controller or the like which bears responsibility for overall node operation/coordination. Further, the HSDPA controller 40 may be implemented using individual hardware circuits, using software programs and data in conjunction with one or more suitably programmed digital microprocessors or general purpose computers, using application specific circuitry (ASIC), and/ or using one or more digital signal processors (DSPs).

The HSDPA controller 40 comprises a HSDPA flow control unit 41, which in turn comprises a HSDPA data frame generator 42, user buffer 43, and a cell change logic unit 44. In terms of HS-DSCH data, the HSDPA data frame generator 42 receives service data units (SDUs) from the core network(s) 22 and, based on various inputs including capacity allocations sent from a radio base station, generates and shapes HS-DSCH data frames.

Figure 2:
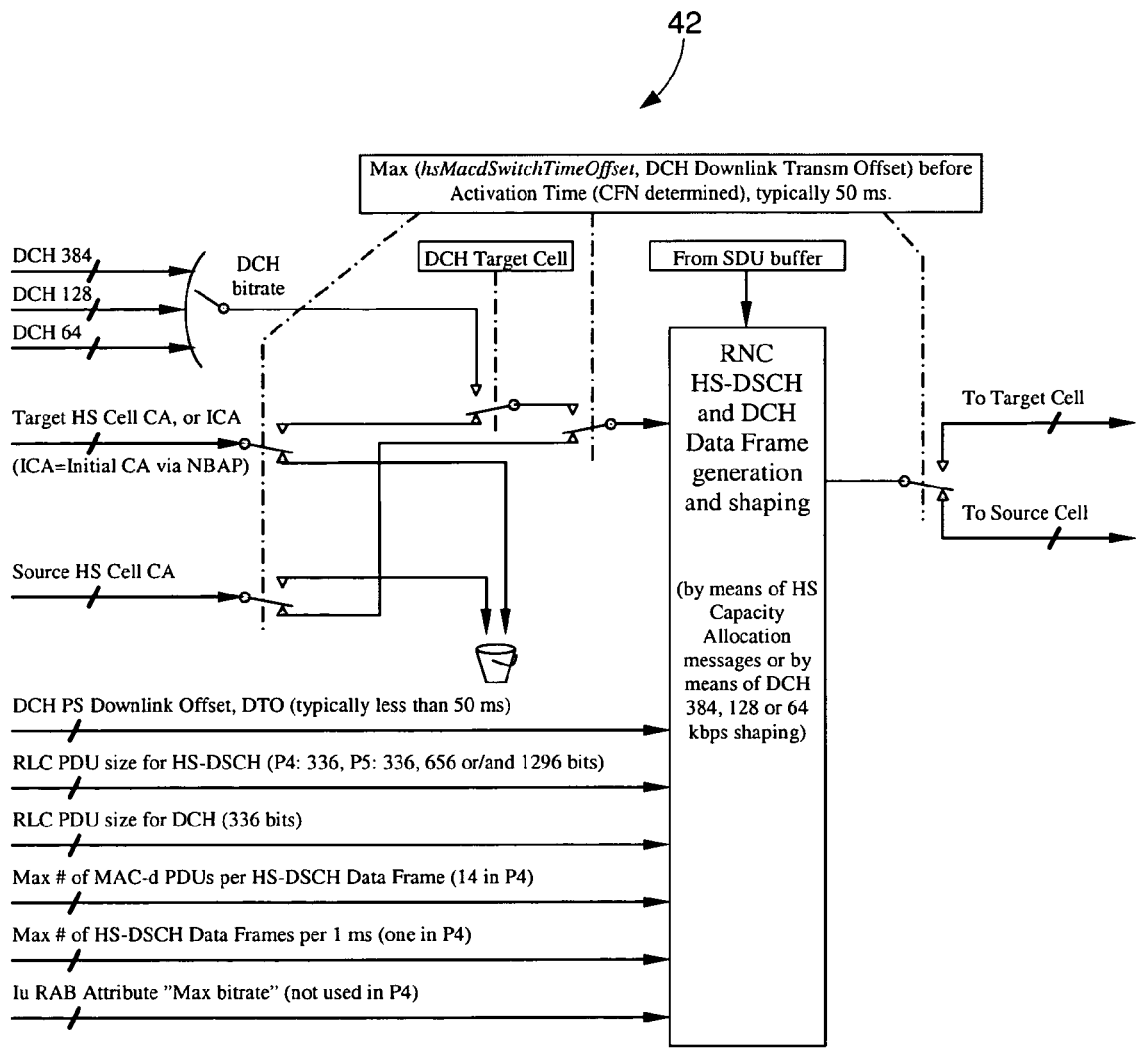
FIG. 2 is a diagrammatic view of one example implementation of a data frame generator for high-speed downlink shared channel (HS-DSCH) data frames.

FIG. 2 illustrates one example implementation of a data frame generator 42 for high-speed downlink shared channel (HS-DSCH) data frames. As such, FIG. 2 shows various inputs that are employed in data frame generation and shaping. Among the inputs are certain capacity allocation (CA) values (described below, such as a capacity allocation from a source cell and a capacity allocation from a target cell). In addition, FIG. 2 depicts by dash-dotted lines various "switches" that are affected by a cell change procedure. The switch time (ST) of the cell change procedure is established by the control node, and occurs at a switch time offset (STO) relative to an activation time (AT). In the particular implementation shown in FIG. 2, the switch time (ST) is the largest (maximum) of a first parameter known as hsMacdSwitchTimeOffset and a second parameter known as DCH Downlink Transmission Offset. Typically the switch time (ST) is, e.g., about 50 ms before the activation time. The activation time (AT) is the time at which time in the cell change procedure at which the cell change procedure becomes effective on an air interface between the target radio base station and the mobile terminal.

The cell change logic unit 42 operates during a cell change procedure and, in addition to features and functions hereinafter described, basically advises the HSDPA data frame generator 42 of the switch time (ST) at which the high-speed downlink shared channel (HS-DSCH) data frames destined for a mobile terminal are to be reallocated from a source radio base station to the target radio base station.

It will be appreciated by the person skilled in the art that control node 26 comprises numerous other functionalities and units, including but not limited to radio link control (RLC) buffer handler 46 and NBAP signal handler 48. The RLC buffer handler 46 is provided since the transmission of the HS-DSCH data frames from the control node 26 to a radio base station 28 occurs in RLC protocol data units (e.g., RLC PDUs). The NBAP signal handler 48 participates in the Node B Application Protocol, which is a control plane protocol used at the Iub interface and carries signaling traffic to manage the logical resources at the Node B (alias, the radio base station 28). Other functionalities and units not illustrated in FIG. 1 or discussed herein are not deemed germane to an understanding of the operation of the cell change procedure described herein, and therefore are not included for sake of brevity.

At various times in conjunction with the cell change procedure, the control node 26 obtains a "capacity allocation" from the radio base stations involved in the cell change, e.g., a source radio base station which serves a source cell (in which the mobile terminal has been receiving data frames on the HS-DSCH) and a target radio base station which serves a target cell (into which the mobile terminal is moving or otherwise should anticipate receiving the data frames on a HS-DSCH in the immediate future). This capacity allocation is an indication of the amount of data that can be transmitted to the radio base station in a certain time interval, it being expected that the time interval is repeatable. Thus, by sending the capacity allocation to the control node, the radio base station essentially authorizes the control node to send more HS-DSCH data frames for filling a priority queue at the radio base station.

In view of the foregoing and other factors, FIG. 1 also illustrates selected structural and functional units of an example, representative radio base station 28. Illustrated as comprising radio base station 28 are the base station's HSDPA controller 50; transceivers 52; a downlink channel quality (CQI) monitor 54; and, NBAP signal handler 58. The HSDPA controller 50 is shown as comprising, among other unillustrated functionalities, a base station flow control unit 61 and a scheduler 62. The base station flow control unit 61 in turn comprises a base station priority queue for each mobile terminal or user participating in the HS-DSCH. For sake of simplicity, only one such priority queue 64 is illustrated in FIG. 1.

The scheduler 62 schedules the HSDPA mobile terminals in the cell controlled by the radio base station, the scheduling being governed according to different policies. For example, the operative policy could be round-robin, a strict according to the CQI values, or a mixture of these factors.

The HSDPA controller 50 may be included with or separate from a node controller or the like which bears responsibility for overall node operation/coordination. The base station flow control unit 61 may be part of or distinct from HSDPA controller 50. Further, as in the case of HSDPA controller 40, the HSDPA controller 50 may be implemented using individual hardware circuits, using software programs and data in conjunction with one or more suitably programmed digital microprocessors or general purpose computers, using application specific circuitry (ASIC), and/or using one or more digital signal processors (DSPs).

Although only one radio base station is shown in FIG. 1, i.e., radio base station $28_{1-2}$, it will be appreciated in conjunction with a cell change procedure that both the source radio base station and the target radio base station have data flow controllers 61 and monitors 54 for the carrier quality (CQI) of the high-speed downlink shared channel (HS-DSCH). The flow controllers supervise the high-speed downlink packet assess activities of the respective radio base stations, and as such manage the priority queue 64 maintained at the radio base station. The priority queue 64 stores data which has been received in HS-DSCH data frames over the Iub interface from control node 26 and which is to be sent on the high-speed downlink shared channel (HS-DSCH) over the air interface to the mobile terminal 30.

The mobile terminal reports carrier quality indicator (CQI) to the radio base station in charge of the cell, and such report is maintained by the CQI monitor 54. The carrier quality indicator (CQI), together with an expression(s) of capabilities of the mobile terminal, is translated to a bitrate. The bitrate is then further reduced if needed in the flow controller 61 of the radio base station, which results in generation of capacity allocation control frames which are sent to the control node regularly and/or per need bases, e.g. at urgent transitions. The authorizing messages include a capacity allocation which can be expressed in various ways, such as in terms of either bitrate or credits, for example. In response to these authorizing messages, the control node sends an appropriate number of further HS-DSCH frames to the radio base station.

It will be appreciated by the person skilled in the art that radio base station 28 comprises numerous other functionalities and units not illustrated in FIG. 1 or discussed herein. The existence and operation of those other functionalities and units are not deemed germane to an understanding of the operation of the cell change procedure described herein, and therefore are not included for sake of simplification and succinctness.

Figure 3:
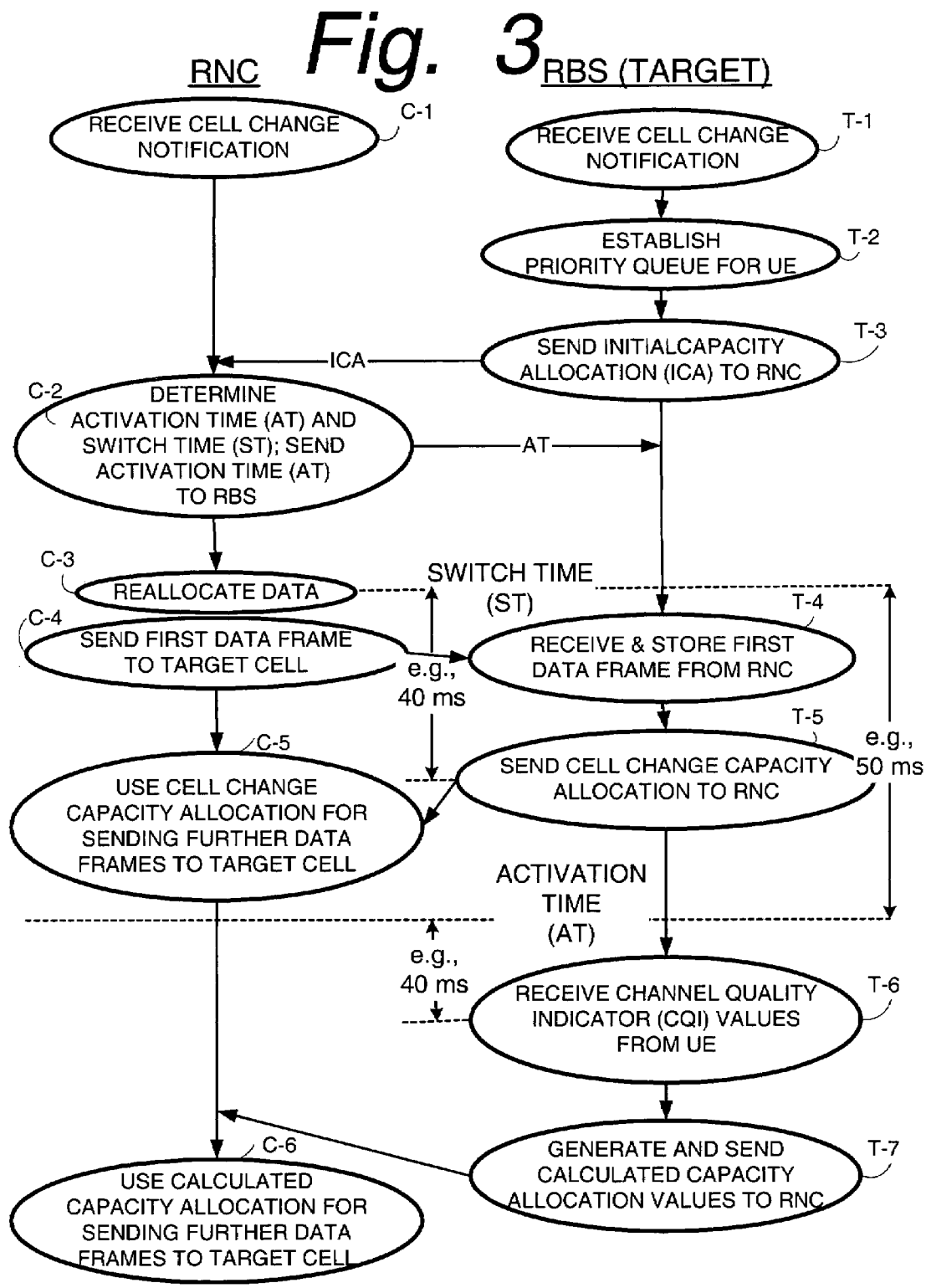
FIG. 3 is a diagrammatic view showing basic, representative, example selected actions performed by a control node and a target radio base station in conjunction with a cell change procedure.

FIG. 3 illustrates selected example, basic steps, events, or actions involved in a cell change procedure according to an example mode of operation. Before the events depicted in FIG. 3 the control node has been sending high-speed downlink shared channel (HS-DSCH) data frames to the source radio base station for transmission to a mobile terminal in the source cell. The reason(s) for initiating the cell change procedure are not necessarily germane to an understanding of the inventive aspects described herein. Yet simply stated, typically the cell change procedure is prompted when a signal of a source radio base station as detected by a mobile terminal declines or tends toward being inferior to a signal of a target radio base station as detected by the mobile terminal.

The basic steps, events, or actions of FIG. 3 which involve a control node are numbered as actions C-x (where x ranges from 1 to 6), while such basic steps, events, or actions which involve a target radio base station are numbered as actions T-y (where y ranges from 1 to 7). The actions of the control node as described with reference to FIG. 3 are primarily those of HSDPA flow control unit 41, and of cell change logic unit 44 operating in conjunction with HSDPA data frame generator 42 in particular. On the other hand, the actions of the radio base station as described with reference to FIG. 3 are primarily those of its base station flow control unit 61.

The aspects of the cell change procedure which are described herein commence with action C-1 and action T-1, both of which essentially involve both the control node and the target radio base station being notified of the commencement of the cell change procedure. In an example implementation, the notifications of action C-1 and T-1 are subsumed in a Node B Application Protocol (NBAP) radio link (RL) setup procedure. The Node B Application Protocol (NBAP) radio link (RL) setup procedure is described, e.g., in 3GPP TS 25.433/25433, Version 6.3.0, which is incorporated by reference herein. Such NBAP RL procedure also typically involves a NBAP RL Reconfiguration PREPARE step in which the target radio base station prepares for the radio link by allocating resources, etc. Such allocation includes, as depicted by action T-2 of FIG. 3, the setup or establishment of the priority queue 64 for the particular mobile terminal (alias, UE) which will use the HS-DSCH and which is the subject of the cell change.

In a NBAP RL Reconfiguration READY step of the NBAP RL procedure, the target radio base station is ready with all preparations. Accordingly, as action T-3, the target radio base station sends to the control node a first capacity allocation message. This first capacity allocation message includes a first type of presumptive capacity allocation for the target radio base station, i.e., an initial capacity allocation or "ICA". In essence, the presumptive capacity allocation or ICA of action T-3 essentially informs the control node how big the first HS-DSCH Data Frame destined to the target radio base station can be. As mentioned above, in one example implementation, the capacity allocation is expressed in terms of either bitrate or transmission credits or some other indicia, preferably which reflects carrier quality indicator (CQI) or some comparable value and capabilities of the mobile terminal. The initial capacity allocation (ICA) should have a small value in order not to congest the Iub interface. In an example illustration, the initial capacity allocation (ICA) can indicate that 8 MAC-d PDUs are to be included in one data frame during 80 ms.

The NBAP signalling of the initial capacity allocation (ICA) is done in an NBAP signalling path existing between NBAP signal handler 58 in the target radio base station and NBAP signal handler 48 in the control node. The NBAP signal handler 48 and NBAP signal handler 58 can be performed by main processors of the respective nodes. While the capacity allocation control frames are sent via the User Plane, the same path is used for the data frames, between the RNC user plane processing and RBS user plane processing.

A fourth step of the NBAP RL procedure is a NBAP RL Reconfiguration COMMIT step. At the time of this fourth step, the control node knows exactly the "activation time (AT)" at which the handover on the air interface should be performed. This activation time (AT) is expressed by a particular connection frame number ($CFN_{AT}$). In addition, since the switch time (ST) occurs at an established offset (STO) from the activation time (AT), the control node is able to compute or derive the switch time (ST). Action C-2 of FIG. 3 not only shows the control node as determining the activation time (AT) and the switch time (ST), but also communicating the activation time (AT), but not the switch time (ST), to the target radio base station. Although not depicted in FIG. 3, the control node also similarly advises the source radio base station of the activation time (AT). Therefore, all nodes involved in the cell change know exactly the activation time (AT). In one example implementation, as part of action C-2 the NBAP RL Reconfiguration message COMMIT sends the Connection Frame number ($CFN_{AT}$), the timing reference at which time both source and target cells and the mobile terminal switch over. The activation time (AT) is determined by the CFN sent via NBAP and the 'present' CFN that is valid right now. When these two meet, the Activation Time occurs.

At the switch time (ST) the control node halts its sending of the high-speed downlink shared channel (HS-DSCH) data frames to the source radio base station. While the sending of frames to the source radio base station thus terminates at the switch time (ST), until the activation time (AT) the source radio base station may continue sending over the air interface to the mobile terminal any data still held by the source radio base station in its priority queue 64 for the mobile terminal.

Further, at the switch time (ST), as action C-3 the control node essentially reallocates incoming data for the HS-DSCH (received, e.g., in incoming SDUs from the core network(s)) so that such data is thereafter not sent to the source radio base station. Instead, data for the HS-DSCH then existing in and thereafter received by the control node is hence forth destined to the target radio base station. In other words, the switch operation of the cell change procedure includes a reallocation at the switch time from the source radio base station to the target radio base station of the high-speed downlink shared channel (HS-DSCH) data frames destined for the mobile terminal.

Until now it has been expected that a control node must wait considerably after the switch time (ST) in order to actually send HS-DSCH data frames to the target radio base station. Previously it was anticipated that the control node must further wait until after the target radio base station has had an opportunity to monitor the quality (CQI) of the particular HS-DSCH carrier utilized in the target call by the mobile terminal, and until after the target radio base station has provided a measured or calculated capacity allocation (based on the CQI) to the control node. Since the capacity allocation is indicative of the bitrate that can be operative for the mobile terminal on the HS-DSCH in the target cell, it seemed reasonable that the control node should wait to be informed of such capacity allocation determination prior to sending HS-DSCH data frames to the priority queue at the target radio base station.

Yet the flow control as implemented by HSDPA flow control unit 41 and base station flow control unit 61 as described herein depart from previous expectation. In this regard, the control node is permitted by example modes and embodiments described herein to begin sending the HS-DSCH data frames to the target radio base station even before the control node knows a calculated capacity allocation for the target cell. In fact, as explained below and illustrated in FIG. 3, the control node is permitted to begin sending the HS-DSCH data frames even prior to the activation time (AT), and typically just after the switch time (ST).

In the above regard, and as alluded previously, before knowing or even being able to calculate a calculated capacity allocation, the target radio base station constructs certain presumptive capacity allocations which are strategically communicated to the control node in order to prime the Iub interface with HS-DSCH data frames in advance of a time at which a calculated capacity allocation is known.

In accordance with one example implementation, there may be two types of presumptive capacity allocations. A first type of presumptive capacity allocation is the initial capacity allocation (ICA) sent from the target radio base station to the control node (action T-3). The initial capacity allocation (ICA) is configured to evoke transmission of a first HS-DSCH data frame from the control node to the target radio base station. As a result of receipt of the initial capacity allocation (ICA), and provided that the user buffer 43 has a user buffer size (UBS) greater than zero, as action C-4 of FIG. 3 the HSDPA data frame generator 42 of control node 26 sends the first HS-DSCH data frame to the target radio base station essentially immediately after the switch time (ST). As action T-4, the target radio base station receives the first HS-DSCH data frame and stores the same in its priority queue 64.

Upon receiving the first high-speed downlink shared channel (HS-DSCH) data frame from the control node, as action T-5 the target radio base station sends to the control node a second capacity allocation, e.g., a second presumptive capacity allocation. This second presumptive capacity allocation is also known as a cell change capacity allocation. This second presumptive capacity allocation is sent to the control node approximately 40 milliseconds after the switch time (ST), and likely before the activation time (AT), and thus before the target radio base station has had an opportunity to determine or could possibly even determine a carrier quality indicator (CQI) for the HS-DSCH carrier or a calculated capacity allocation.

In an example implementation, the presumptive cell change capacity allocation is related to an acceptable carrier quality indicator value at a cell border for the cell change. In other words, the cell change capacity allocation is selected to approximate an acceptable carrier quality indicator (CQI) which might occur at a physical location near a periphery of the target cell, thereby simulating the conditions of the mobile terminal which is possibly now entering or nearing the periphery of the target cell. In general, carrier quality indicator (CQI) values range between approximately 1 and 31, with a typical value being about 15. Therefore, in an example implementation, a presumptive capacity allocation value (cell change capacity allocation) is chosen to reflect a carrier quality indicator (CQI) of 7. A carrier quality indicator (CQI) value of 7 corresponds to a bitrate of approximately 0.2 to 1.2 Mbps, and (in rare cases) up to Mbps. In a sense, this cell change capacity allocation is an intelligently "guessed" value, rather than a calculated capacity allocation.

A benefit in generating such a cell change capacity allocation by the target radio base station is that the "guessed" capacity allocation will be filtered from an Iub interface congestion point of view. Even if the cell change capacity allocation is good from a Uu interface point of view, it may be too high for the Iub interface and therefore can be reduced, as would be any other capacity allocation, in case of a bottleneck.

Upon receiving the second presumptive capacity allocation sent from the target radio base station as action T-6, as action C-5, the control node sends to the target radio base station further high-speed downlink shared channel (HS-DSCH) data frames. These further high-speed downlink shared channel (HS-DSCH) data frames sent as action C-5 are sent in accordance with the second presumptive capacity allocation, e.g., the cell change capacity allocation. Being sent in accordance with the cell change capacity allocation means that the amount of data sent in HS-DSCH data frames from the control node to the target radio base station is dependent upon a specified amount (e.g., bitrate or number of credits) indicated by the cell change capacity allocation. The sending of these further HS-DSCH data frames as action C-5 may occur either before or slightly after the activation time (AT), and preferably arrive very close to the activation time (AT). Although not specifically illustrated as such in FIG. 3, these further HS-DSCH data frames sent as action C-5 are, upon receipt at the target radio base station, stored in the priority queue 64 of the mobile terminal.

Eventually, after the activation time (AT), the target radio base station has an opportunity to monitor the carrier quality of the HS-DSCH channel which the mobile terminal utilizes in the target cell. Specifically, after receiving control signals or the like on the HS-DSCH, the mobile terminal sends to target radio base station a measurement or report of regarding the quality of the HS-DSCH carrier. Using such measurements or reports, the downlink channel quality (CQI) monitor 54 generates a carrier quality indicator (CQI). The carrier quality indicator (CQI) is communicated to base station flow control unit 61. FIG. 3 shows, as action T-6, the base station flow control unit 61 receiving the carrier quality indicator (CQI). Further, as action T-7 the base station flow control unit 61 deduces or calculates a calculated capacity allocation which is based, e.g., on the carrier quality indicator (CQI), and sends the calculated capacity allocation to the control node. Other factors besides the carrier quality indicator (CQI) are typically employed to deduce or calculate the calculated capacity allocation.

Among the other factors possibly included in determining the calculated capacity allocation are, for example, a HS- DSCH capability rating of the mobile terminal. Each mobile terminal reports its own CQI. Some mobile terminals are high-end while other mobile terminals are low-end. In general there should be a range of mobiles that support HSDPA, but with different cost levels. For example, some mobile terminals can only send data every second 2 ms TTI, some every third 2 ms TTI, and so forth. Thus, there are different categories of mobile terminals that support different bitrates, etc.

This calculated capacity allocation is a third type of capacity allocation which, as action T-7, is sent to the control node. After the target radio base station sends this third or calculated capacity allocation to the control node, as action C-6 the control node sends to the target radio base station yet further high-speed downlink shared channel (HS-DSCH) data frames in accordance with the third capacity allocation.

Should no calculated capacity allocation values occur within a certain time period after activation time (AT), e.g., 20 ms after activation time (AT), the base station flow control unit 61 should generate a low or zero capacity allocation.

It will be appreciated that thereafter periodically, or on a need basis, the calculated capacity allocation is sent by the target radio base station to the control node since, e.g., the carrier quality indicator (CQI) may change or other factors involved in determining the calculated capacity allocation may change.

Another novel aspect is the radio base station node which serves a cell which is a target cell at an onset of a cell change procedure. The target radio base station comprises a transceiver 52 for communicating with the mobile terminal on a high-speed downlink shared channel (HS-DSCH) carrier over an air interface; the carrier monitor 54 which determines the carrier quality indicator for the high-speed downlink shared channel (HS-DSCH) carrier; and, the flow controller 61. As indicated above, even before the carrier quality indicator is available, the flow controller 61 generates a presumptive capacity allocation message for enabling the control node of the radio access network to send a high-speed downlink shared channel (HS-DSCH) data frame(s) to the target radio base station node.

In an example implementation discussed above, in conjunction with a NBAP RL Reconfiguration and as action T-3 of FIG. 3 the flow controller 61 of the radio base station sends a first presumptive capacity allocation message and includes an initial capacity allocation which is configured to authorize the control node to send a first high-speed downlink shared channel (HS-DSCH) data frame to the radio base station. Upon receipt of the first high-speed downlink shared channel (HS-DSCH) data frame from the control node, as action T-5 the flow controller generates and further sends a second presumptive capacity allocation message to the control node. This second presumptive capacity allocation message includes a second presumptive capacity allocation, e.g., a cell change capacity allocation. Preferably this cell change capacity allocation is related to an acceptable carrier quality indicator value at a cell border for the cell change.

Thereafter, when the carrier quality indicator becomes available (as at action T-6), the radio base station as action T-7 sends a calculated capacity allocation to the control node, the calculated capacity allocation being dependent upon the carrier quality indicator for the high-speed downlink shared channel carrier in the target cell.

Another novel aspect is the control node which, in conjunction with the cell change procedure for a mobile terminal, begins to send high-speed downlink shared channel (HS-DSCH) data frames to a target radio base station before the control node knows a calculated capacity allocation for the target cell. The control node responds to the initial capacity allocation by sending a first HS-DSCH data frame (as action C-4) to the target radio base station essentially immediately after switch time (ST). Thereafter, upon receipt of the cell change capacity allocation from the target radio base station, as action C-5 the control node sends further HS-DSCH data frames to the target radio base station in accordance with the specified cell change capacity allocation. After the target radio base station has had the opportunity to monitor the carrier quality indicator (CQI) for the HS-DSCH carrier and to report a calculated capacity allocation to the control node, as action C-6 the control node sends yet further HS-DSCH data frames to the target radio base station in accordance with the calculated capacity allocation.

Thus, the method and apparatus described herein significantly depart from previous expectation by, e.g., permitting the control node to begin sending the HS-DSCH data frames to the target radio base station even before the control node knows a calculated capacity allocation for the target cell.

Figure 4:
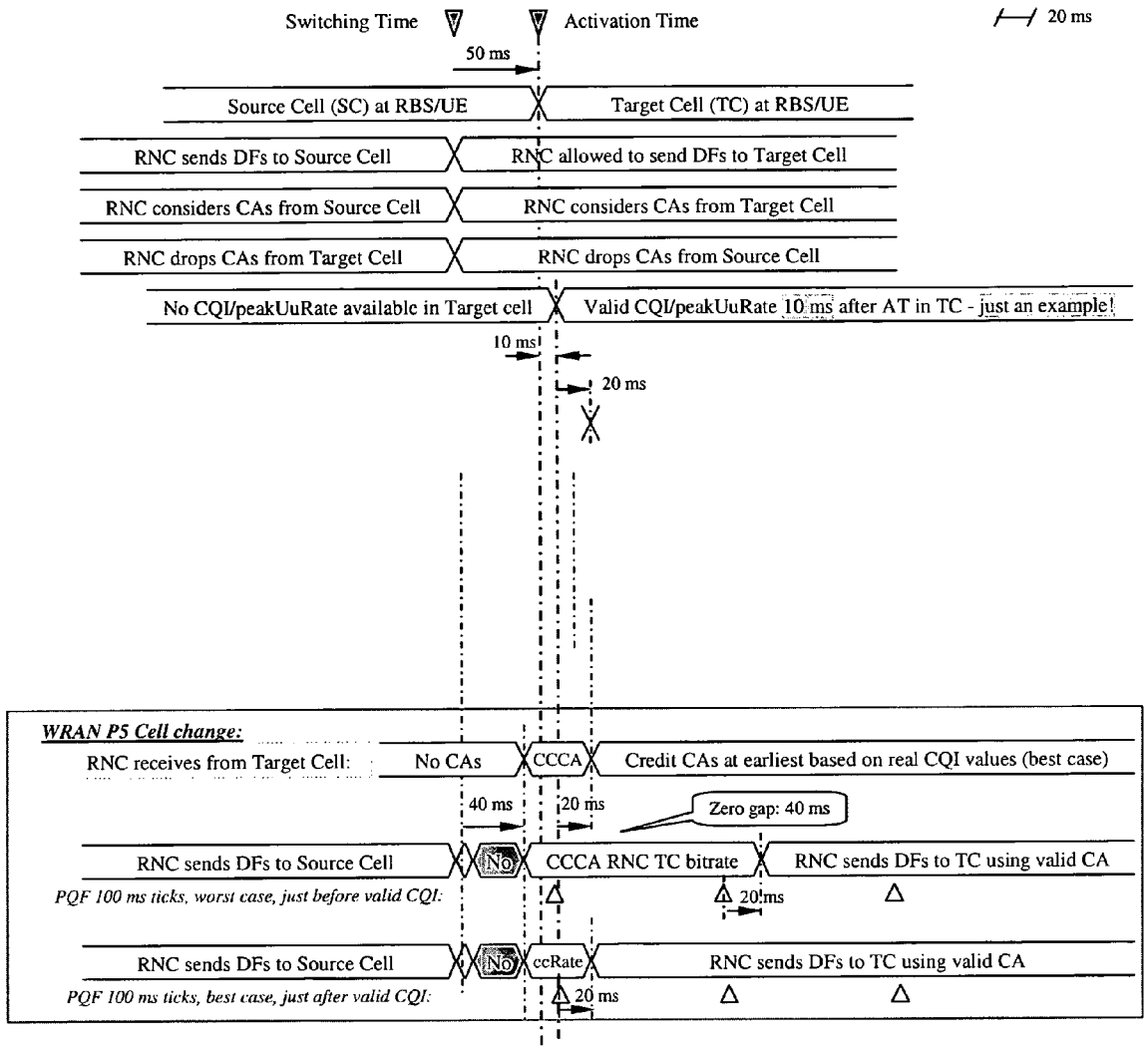
FIG. 4 is a diagrammatic view which illustrates how presumptive capacity allocations reduce a RNC bitrate gap towards a target radio base station.

As illustrated by FIG. 4, such pre-knowledge transmission of HS-DSCH data frames by the control node effectively reduces an RNC transmission gap which otherwise would occur had the control node waited to send the high-speed downlink shared channel (HS-DSCH) data frames after the control node had been informed of the calculated capacity allocation. FIG. 4 particularly shows the control node (e.g., RNC) receiving the cell change capacity allocation (CCCA in FIG. 4) from the target radio base station. Further, for both a worst case scenario (last line of FIG. 4) and a best case scenario (next to the last line of FIG. 4) FIG. 4 also shows the sending of HS-DSCH data frames from control node at the cell change capacity allocation to the target radio base station. The sending of HS-DSCH data frames at the cell change capacity allocation for the best case scenario is labeled as ccRate, while the sending of HS-DSCH data frames at the cell change capacity allocation for the worst case scenario is labeled as CCCA RNC TC bitrate. In other words, in terms of figure nomenclature ccRate is an abbreviated form of CCCA RNC TC bitrate, e.g., CCCA RNC Target Cell bitrate. In FIG. 4, the first rhombus after the switch time (ST) is the first HS-DSCH data frame that the control node can send to the target radio base station as authorized by the initial capacity allocation (ICA). In both the worst case and the best case the above-referenced RNC transmission gap, depicted by the word "No", is considerably shorter than would it would otherwise be had the sending of HS-DSCH data frames not begun until after a valid CA (i.e., a calculated capacity allocation) had been received from the target radio base station.

In fact, using the presumptive capacity allocations, the control node is permitted to begin sending the HS-DSCH data frames even prior to the activation time (AT), and typically just after the switch time (ST).

The control node (e.g., RNC) thus decides the activation time (AT) at which to switch-over on the air interface the HS-DSCH data frame 'stream' from the source cell to the target cell. The switch time (ST) is offset from the activation time (AT) by the switch time offset (STO), estimated to 50 ms or so. In conjunction with the cell change the control node must await some type of capacity allocation indication from the target radio base station. As described above, in accordance with aspects of operation described herein the control node is indeed provided with presumptive capacity allocations which tend to reduce the RNC bitrate transmission gap.

It is to be noted that the control node cannot merely assume or use the capacity allocation that previously had been sent from the source radio base station, which could mean a tremendous overload of the Iub interface towards target cell.

Suppose, for example, that the source cell supports 1 Mbps and the target cell supports only 100 kbps for the user. This differential in support could be by reason that many users are connected and are using the packet data service in target cell, while source cell was 'empty'.

As one aspect described herein, capacity allocation, which essentially indicates (in principle) a bitrate, must originate from the cell to which the HS-DSCH data frames are destined. As an example, non-limiting implementation, a capacity allocation can be based on or indicate a number of PDUs with a certain length repeated during an interval where the interval normally is repeated. In accordance with this aspect, the Iub interface (between RNC and RBS) cannot be overloaded due to incorrect capacity allocation information. The mobile terminal reports its air-interface quality via the carrier quality indicator (CQI) reports. The carrier quality indicator (CQI) is valid for the quality between source cell and UE before activation time (AT) and between the target cell and mobile terminal after activation time (AT). A good carrier quality indicator (CQI) is not available in the target cell before activation time (AT) and could just be expected some time after AT, e.g. 10 ms or so.

The radio base station need not send the full capacity allocation it determines but may, when needed, further decreased the calculated capacity allocation before sending the same to the control node.

In an example implementation, the capacity allocation can reflect a number of PDUs with a certain length repeated during an interval, where the interval normally is repeated.

Figure 5:
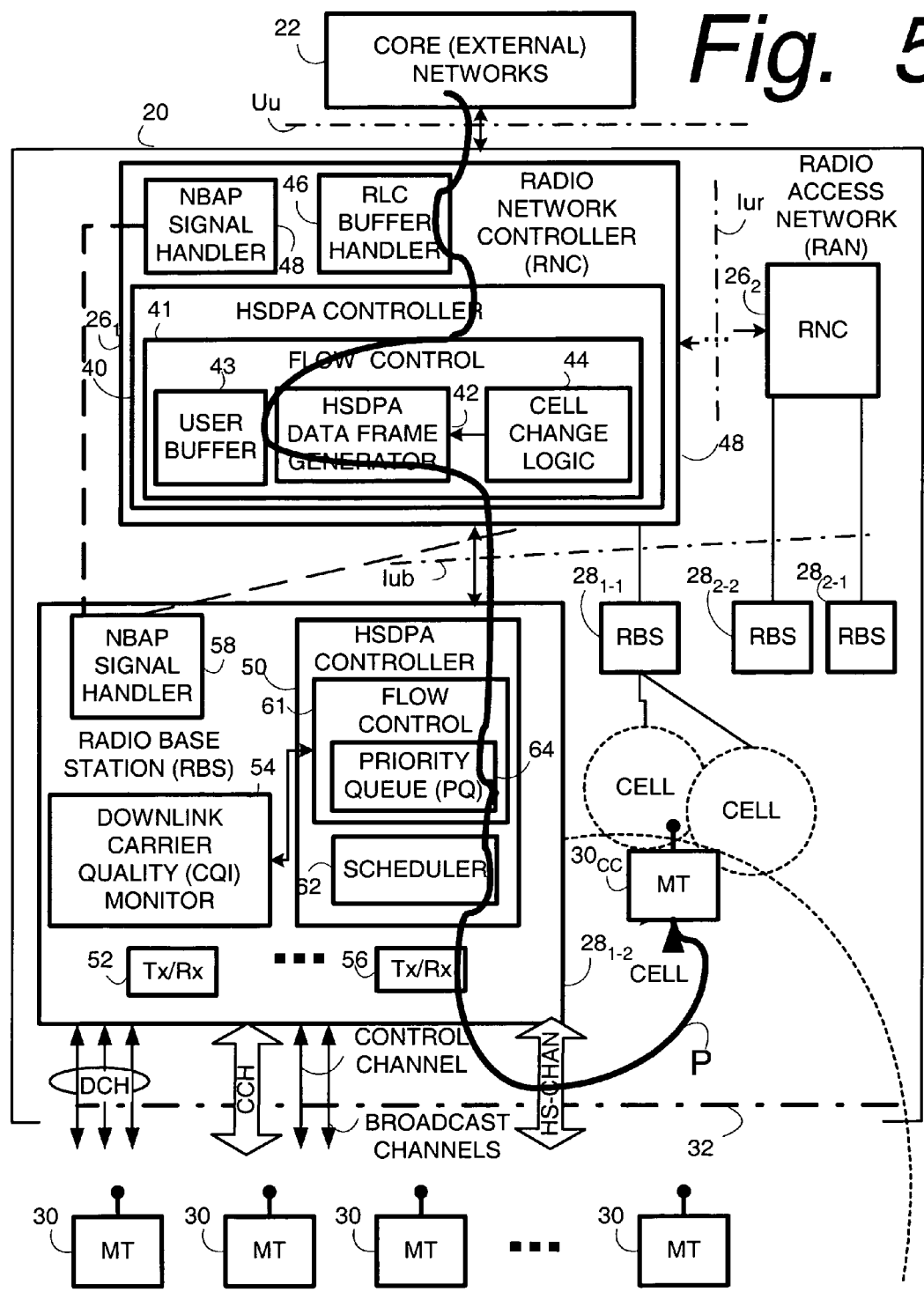
FIG. 5 is a diagrammatic view showing a path of HS-DSCH data through the radio access network (RAN) of FIG. 2.

Now that aspects of the cell change procedure have been described, it will be appreciated that FIG. 5 shows (by heavy line P) a path of HS-DSCH data through the radio access network (RAN) of FIG. 2. Specifically, the user data to be transmitted on the HS-DSCH originates, e.g., in core network 22 and is supplied in the form of SDUs to the HSDPA data frame generator 42 of control node 26. The HSDPA data frame generator 42 frames and shapes the data into RLC PDUs which are carried across the Iub interface to radio base station 28. At the radio base station 28 the HS-DSCH data is stored in priority queue 64, and scheduled by scheduler 62 for transmission over the HS-DSCH carrier to the mobile terminal 30.

Another novel aspect concerns an optional and separate feature of the source radio base station, e.g., the radio base station which serves a cell which is a source cell at an onset of the cell change procedure involving the mobile terminal, and a method of operation engendered thereby. The source radio base station comprises a transceiver 52 for communicating with the mobile terminal on a high-speed downlink shared channel (HS-DSCH) carrier over the air interface; a flow controller 61 which at least partially controls a flow of the high-speed downlink shared channel (HS-DSCH) data frames over the air interface to the mobile terminal; and, a priority queue 64 which stores data to be included in the high-speed downlink shared channel (HS-DSCH) data frames that are to be sent over the air interface to the mobile terminal.

Figure 6:
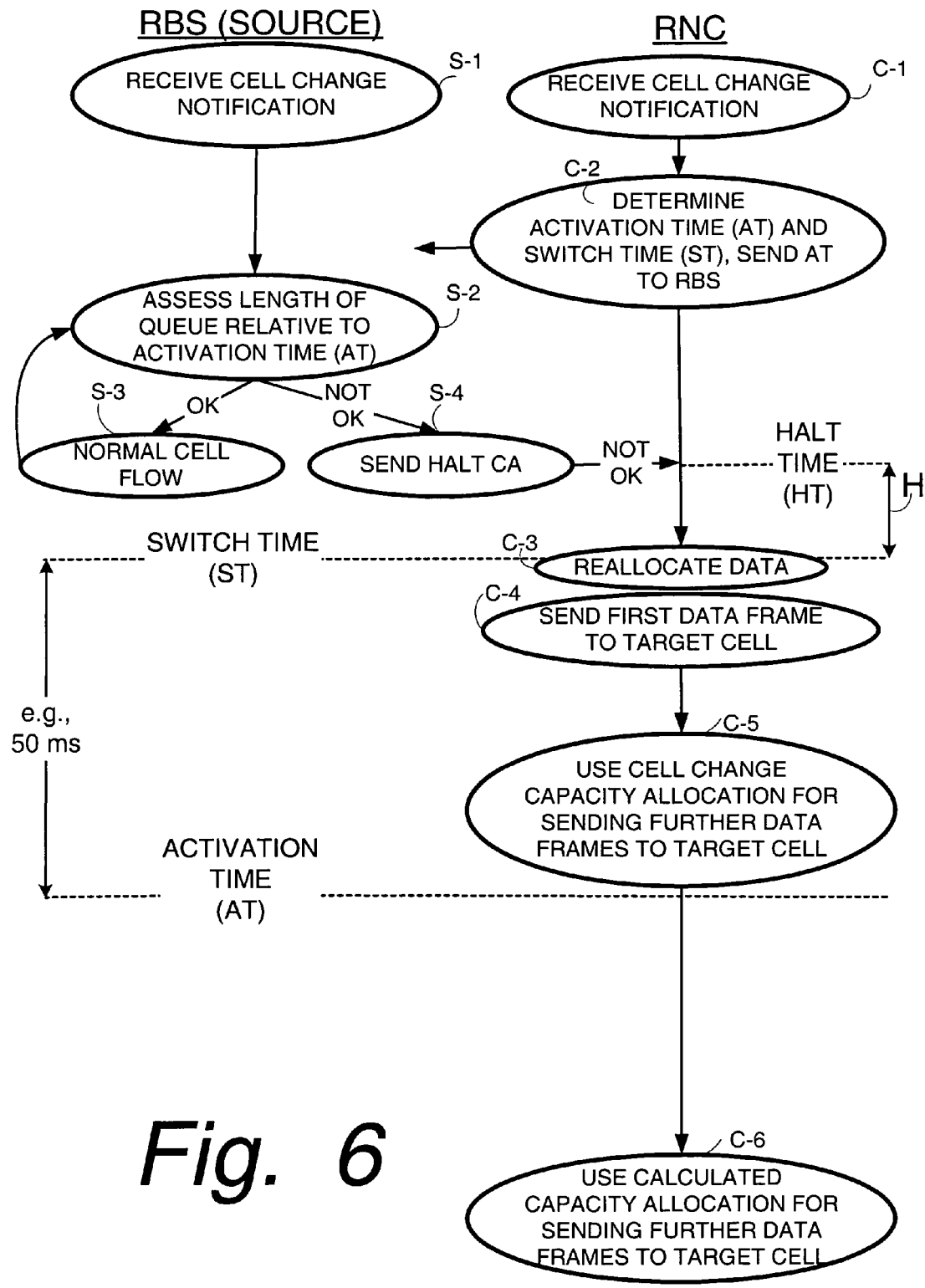
FIG. 6 is a diagrammatic view showing basic, representative, example selected actions performed by a source radio base station in conjunction with another aspect of another mode of a cell change procedure.

In accordance with this further aspect, flow controller 61 is arranged to perform certain basic steps, events, or actions-represented and depicted as actions S-z in FIG. 6 (where z ranges from 1 to 4). FIG. 6 also shows actions of the control node similar to those illustrated in FIG. 3 for sake of establishing a timing reference with the actions of the control node. While the actions performed by the source radio base station as illustrated in FIG. 6 may, in fact, occur in the context of the cell change procedure as illustrated in FIG. 2, it should be understood that the actions of source radio base station herein described are separable and accordingly that one or more actions of FIG. 2 need not be performed for the scenario described for FIG. 6.

Action S-1 of FIG. 6 shows the source radio base station being notified of commencement of the cell change procedure, in similar manner as occurred for the target radio base station in FIG. 2. Further, as a result of action C-2, the source radio base station is informed of the activation time (AT), e.g., a CFN, for the anticipated handover.

As action S-2 the base station flow control unit 61 makes an assessment of an amount of the data in the queue 64 relative to an activation time of the cell change procedure. The assessment performed by the flow controller 61 at action S-2 can further involve an assessment of a quality of transmission of the high-speed downlink shared channel (HS-DSCH) data frames on the air interface. If the assessment of action S-2 tends to indicate that the source radio base station will have no problem (i.e., is "OK") transmitting all the data in the priority queue 64 prior to the activation time (AT), then as action S-3 the base station flow control unit 61 continues interacting with the control node in normal fashion, e.g., sending normal capacity allocations. On the other hand, if the assessment of action S-2 tends to indicate that, should the source radio base station take on further data in its priority queue 64, there may be a risk (i.e., "not OK") that some of the data in priority queue 64 would not be transmitted over the air interface in time before the activation time (AT), then action S-4 is performed.

The assessment of action S-2 takes into consideration not only the time length for the priority queue 64 (e.g., the PQ time length), but also the round trip time (RTT). As a precaution, for the same PQ flow the assessment of action S-2 is performed periodically (e.g., every 100 ms) between switch time (ST) and activation time (AT), as indicated by the return arrow from action S-3 to action S-2. In other words, instead of evaluating all PQ flows all the time, the flows are evaluated with 100 ms intervals, where the intervals are skewed in time.

Action S-4 involves the base station flow control unit 61 sending information to the control node to cause the control node to decrease sending of high-speed downlink shared channel (HS-DSCH) data frames to the radio base station. The information so sent to control node at action S-4 can take the form of a "halt" signal to essentially stop the further flow of HS-DSCH data frames from the control node to the priority queue 64 of the source radio base station. In particular, the "halt" signal may be a zero value capacity allocation, e.g, a ZeroCA. The fact that the ZeroCA has a zero value causes the HSDPA data frame generator 42 of the control node to stop sending HS-DSCH data frames to the source radio base station. Thus, the source radio base station essentially sends a halt signal to the control node to effective terminate the flow of HS-DSCH data frames to the source radio base station. In some situations, the halt signal or ZeroCA may reach the HSDPA data frame generator 42 sufficiently in advance of the switch time (ST) that the flow of HS-DSCH data frames to the terminates considerably before the switch time (ST), as illustrated by arrow H in FIG. 6.

Thus, the flow controller 61 of the source radio base station, knowing in advance the activation time (AT), essentially determines whether the receipt of more data for the HS-DSCH in its priority queue 64 would risk the possibility that data priority queue 64 may not be transmitted over the air interface to the mobile terminal before the activation time (AT) for the cell change. In such case, for example, the information sent to the control node of the radio access network can essentially halt the control node from sending further high-speed downlink shared channel (HS-DSCH) data frames to the radio base station, even before the switch time (ST) at which routing of HS-DSCH data frames to the source radio base station would otherwise cease.

The operation of the source radio base station in accordance with the aspect of FIG. 6 can be conceptualized with in optional alternative modes. The first mode involves using an actual round trip time (RTT), if such is or becomes standardized (e.g., in 3GPP). The second mode involves using an assumed RTT, if not standardized.

The RTT is not a constant value. RTT is measured per flow. A flow can take different paths in the transport network, e.g. if ring structures are used. RTT must therefore be measured per HS-DSCH data frame flow.

The RTT can be used for various purposes, two of which are now mentioned. The first purpose is RTT measured when there is a needed for the cell-change procedure, e.g. just before the cell change. According to the second purpose, if a PM counter measures RTT, measurements every 1 seconds or so might be suitable.

In an example, non-limiting implementation, at every PQ 100 ms time tick, the operations described in Table 1 are performed.

In Table 1, SC refers to the Source Cell; caZeroTime is the estimated time when CA=0 should be sent; AT=Activation time (defined by the CFN in NBAP RL Reconfig); the degradeFactor could be 0.9 or so (it represents the degradation of the radio performance from now until the Activation Time); the RBS does not know anything about Switch time (i.e., the RNC parameter hsMacdSwitchTimeOffset is not known in RBS).

TABLE 1

IF Activation Time is known for the PQF (the RL Reconfiguration message has propagated to the flow control function), then calculate when to send caZero or a CA with an Repetition period according to the below equations.
scTimeToAt = ((AT −Now) MOD 'counterRange') * 'counterResolution'
estPqEmptyTime = (PQT +RTT) / degradeFactor
IF scTimeToAt −100 ms < estPqEmptyTime
THEN caZeroTime = scTimeToAt −estPqEmptyTime
IF caZeroTime <= 0 OR Floor (caZeroTime / caInterval) = 0
THEN send caZero now (at this PQ 100 ms time tick)
ELSE send CA with repetitionPeriod =
Floor (caZeroTime / caInterval)
ELSE send CA normally Described above are systems having an RLC protocol connection between an RNC and a number of RBSs. The RNC sends HS-DSCH data frames with a certain bitrate (shaping) to the RBSs. Handover from a source cell in a first RBS to a target cell in a second RBS (note: the first and second RBS could be the same node in this example) means that the data frames are rerouted from source cell to target cell. The RNC determines when to reroute from sending data frames to the source cell to sending to the target cell. The time when to reroute is called Switch Time, and is compared with the Activation Time which is the time when the RBSs and the UE performs the handover from source to target cell in the air-interface (The Activation Time is determined by the RL Reconfiguration Commit message).

The cells determine the bitrate to be used by the respective source cell and target cell in a flow control point of view. The RNC only uses capacity allocation messages sent from source cell when sending data frames to source cell, capacity allocation messages received from target cell are dropped. When sending data frames to target cell, only capacity allocation messages sent from target cell are used, capacity allocation messages received from source cell are dropped.

At Switch time, the RNC sends a first data frame (assuming a lot of data is to be sent from RNC). The number of RLC PDUs is determined by the Initial Capacity Allocation, sent to RNC before Switch Time via NBAP RL setup procedure. When the target cell receives the first data frame from RNC (with User Buffer Size >0), it directly sends a 'cell-change capacity allocation'. When a 'cell-change capacity allocation' is sent from target cell, the 'bitrate' which it expresses has been reduced by considering the degree of Iub/Iur congestion, if needed. This means that the 'cell-change capacity allocation' used by RNC will not overload the Iub/Iur interface.

The 'cell-change capacity allocation' is based on a typical bitrate value based on a typical CQI at cell change and UE capabilities. The 'cell-change capacity allocation' is used until a bitrate can be expressed based on a valid CQI UE report or until a certain time has elapsed after the Activation Time.

As data frames are stopped being sent to source cell at Switch Time, this is often a good-enough solution. However, if the Priority Queue Time length (PQT) is too long, a capacity allocation message expressing a zero bitrate, (caZero) should be sent a certain time before Activation Time. The RBS source cell doesn't know when RNC Switch Time occurs. The estimated time of emptying the Priority Queue (estPqEmptyTime) in source cell is calculated using the Priority Queue Time length, the RBS-RNC-RBS Round-Trip-Time and a constant called degradeFactor. The degradeFactor describes air-interface degradation until Activation Time (the RTT value could be either a measured value or a configured value). The time sending a capacity allocation message expressing a zero bitrate, 'caZero', is calculated by using the Activation Time and the estPqEmptyTime. The capacity allocation messages can be sent form source cell every 100 ms. The time of applying zero bitrate for RNC is determined by setting the 'HS-DSCH Repetition Period' value in capacity allocation message sent in advance from the RBS source cell.

Figure 7:
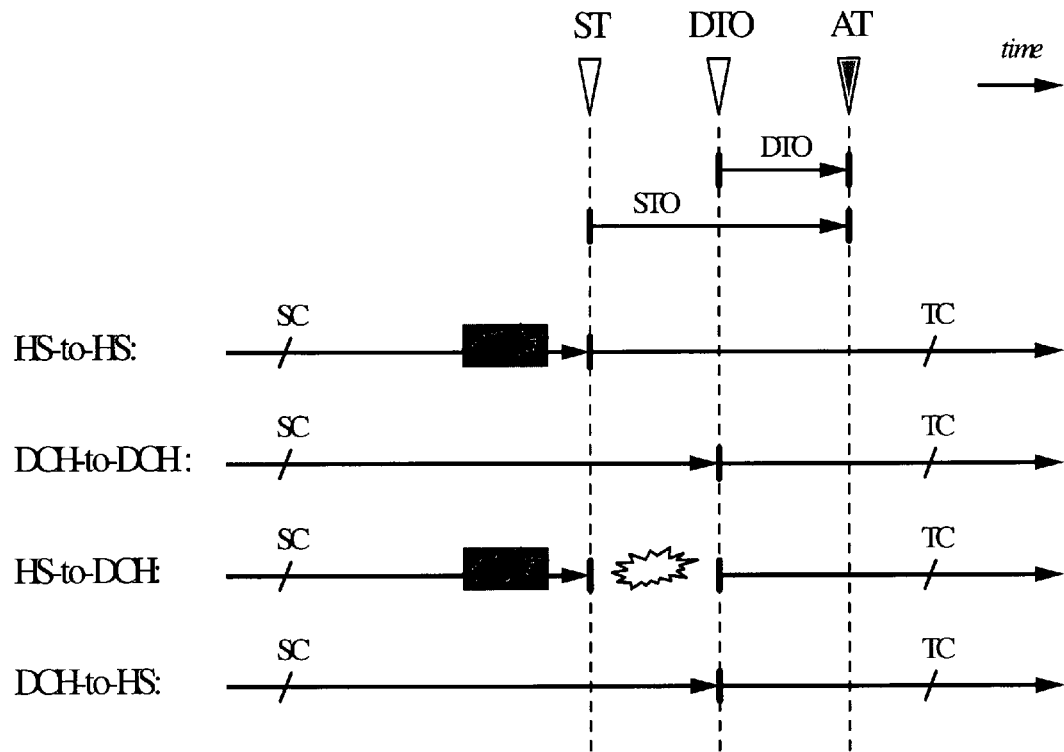
FIG. 7 is a diagrammatic view showing cell changes, e.g., between high-speed downlink shared channel (HS-DSCH) and DCH channels.

FIG. 7 shows example cell changes between high-speed downlink shared channel (HS-DSCH) and DCH channels. In FIG. 7, "HS" denotes HS-DSCH data frames; "DCH" denotes DCH data frames; "HS-to-HS" denotes hand-over/cell-change from HS source cell to HS target cell; "DCH-to-DCH" denotes hand-over/cell-change from DCH source cell to DCH target cell; "SC" denotes source cell; "TC" denotes target cell; "ST" denotes the switch time (ST), which is HS related; "STO" denotes the switch time offset; "DTO" denotes the downlink transmission offset (which is DCH related); and "AT" denotes the activation time (i.e., the time when the mobile terminal hands over from the source radio base station to the target radio base station). The unshaded bursts depict RNC HS or DCH data frame transmission gaps; the shaded bursts depict a transmission gap if a capacity allocation with zero or small credit is sent from the radio base station.

In terms of FIG. 7, the switch time offset includes an assumption that the high-speed downlink shared channel (HS-DSCH) priority queue (PQ) in the radio base station contains data which empties just in time before activation time (AT). The downlink transmission offset (DTO) is sued for DCH and includes transport network delay and processing time in the radio base station before sending data over the air interface.

As described above, the base station flow control unit 61 of the source radio base station can send a capacity allocation control frame to the control node earlier than switch time (ST), particularly in the case when too much data is available in the priority queue 64 while the air interface performance decreases (in which even the priority queue time (PQT) length gets too long, and perhaps longer than the switch time offset (STO). Such capacity allocation, e.g., the ZeroCA, is sent at a 100 ms priority queue evaluation period time-tick for the priority queue 64 in question. This capacity allocation has a small value, which corresponds to an estimate based on the priority queue time length and a capacity allocation-to-data frame RTT. Thus, this capacity allocation contains a credit with a zero value or other small credit value. If a capacity allocation is sent with such a small credit or value, the HSDPA data frame generator 42 in the control node may stop data frame generation even before switch time (ST), making a transmission gap between receiving such a small capacity allocation or after the short credit and until switch time (ST) is reached.

While the invention has been described in connection with what is presently considered to be the most practical and preferred embodiment, it is to be understood that the invention is not to be limited to the disclosed embodiment, but on the contrary; is intended to cover various modifications and equivalent arrangements included within the spirit and scope of the appended claims.

What is claimed is:

1. A control node of a radio access network which controls radio base station nodes and which, in conjunction with a cell change procedure for a mobile terminal and subsequent to receipt of a presumptive capacity allocation received from a target radio base station, is configured to begin to send high-speed downlink shared channel (HS-DSCH) data frames which have not been sent to a source radio base station to the target radio base station which serves a target cell before the control node knows a calculated capacity allocation for the target cell, the calculated capacity allocation but not the presumptive capacity allocation being dependent upon a reported carrier quality indicator for the high-speed downlink shared channel in the target cell.

2. The node of claim 1, wherein sending the high-speed downlink shared channel (HS-DSCH) data frames to the target radio base station before the control node knows a calculated capacity allocation for the target cell serves to reduce a control node bitrate transmission gap which otherwise would occur had the control node waited to send the high-speed downlink shared channel (HS-DSCH) data frames after the control node had been informed of the calculated capacity allocation.

3. The node of claim 1, wherein the high-speed downlink shared channel (HS-DSCH) data frames sent to the target radio base station are sent to the target radio base station prior to an activation time, the activation time being a time in the cell change procedure at which the cell change procedure becomes effective on an air interface between the target radio base station and the mobile terminal.

4. The node of claim 1, wherein the presumptive capacity allocation for the target cell is a cell change capacity allocation which is acquired from the target radio base station and is related to an acceptable carrier quality indicator value at a cell border for the cell change.

5. The node of claim 1, wherein before knowing the calculated capacity allocation for the target cell and essentially at a switch time of a switch operation of the cell change procedure, the control node sends a first high-speed downlink shared channel (HS-DSCH) data frame to the target radio base station, the switch operation including a reallocation at the switch time from the source radio base station to a target radio base station which serves the target cell of the high-speed downlink shared channel (HS-DSCH) data frames destined for the mobile terminal.

6. The node of claim 1, wherein at a switch time of a switch operation the control node sends a first high-speed downlink shared channel (HS-DSCH) data frame to the target radio base station in accordance with a first capacity allocation; wherein after receiving a cell-change capacity allocation from the target radio base station the control node sends further high-speed downlink shared channel (HS-DSCH) data frame(s) to the target radio base station in accordance with the cell change capacity allocation; and wherein upon receiving from the target radio base station the calculated capacity allocation, the control nodes sends further high-speed downlink shared channel (HS-DSCH) data frames to the target radio base station in accordance with the calculated capacity allocation, the switch operation including a reallocation at the switch time from the source radio base station to a target radio base station which serves the target cell of the high-speed downlink shared channel (HS-DSCH) data frames destined for the mobile terminal.

7. The node of claim 6, wherein the cell-change capacity allocation is related to an acceptable carrier quality indicator value at a cell border for the cell change.

8. A radio base station node of a radio access network which serves a cell which is target cell at an onset of a cell change procedure involving a mobile terminal, the node comprising:
a transceiver configured to communicate with the mobile terminal on a high-speed downlink shared channel (HS-DSCH) carrier over an air interface;
a carrier monitor configured to determine a carrier quality indicator for the high-speed downlink shared channel (HS-DSCH) carrier;
a flow controller which, before the carrier quality indicator is available, is configured to generate a presumptive capacity allocation message for enabling a control node of the radio access network to send a high-speed downlink shared channel (HS-DSCH) data frames which have not been sent to a source radio base station to the radio base station node, the presumptive capacity allocation message including an initial capacity allocation which is configured to authorize the control node to send a first high-speed downlink shared channel (HS-DSCH) data frame to the radio base station.

9. The node of claim 8, wherein the presumptive capacity allocation message is a first presumptive capacity allocation message.

10. The node of claim 9, wherein flow controller is further configured to send a second presumptive capacity allocation message which includes a cell change capacity allocation, and wherein the radio base station sends the second presumptive capacity allocation message with the cell change capacity allocation upon receipt of the first high-speed downlink shared channel (HS-DSCH) data frame.

11. The node of claim 8, wherein the presumptive capacity allocation message includes a cell change capacity allocation.

12. The node of claim 11, wherein the cell change capacity allocation is related to an acceptable carrier quality indicator value at a cell border for the cell change.

13. The node of claim 8, wherein when the carrier quality indicator is available, the radio base station sends a calculated capacity allocation to the control node, the calculated capacity allocation being dependent upon the carrier quality indicator for the high-speed downlink shared channel carrier in the target cell.

14. A method of operating a telecommunications system to perform a cell change procedure, the telecommunications system comprising a control node which controls plural radio base stations including a source radio base station and a target radio base station, the method comprising:
 sending high-speed downlink shared channel (HS-DSCH) data frames from the control node to the source radio base station for transmission to a mobile terminal in a source cell before the cell change procedure;
 receiving a presumptive capacity allocation received from a target radio base station, the presumptive capacity allocation message including an initial capacity allocation which is configured to authorize the control node to send a first high-speed downlink shared channel (HS-DSCH) data frame to the target radio base station;
 and then, during the cell change procedure:
  halting the sending of the high-speed downlink shared channel (HS-DSCH) data frames from the control node to the source radio base station; and
  beginning to send the high-speed downlink shared channel (HS-DSCH) data frames which have not been sent to the source radio base station to the target radio base station which serves a target cell before the control node knows a calculated capacity allocation for the target cell, the calculated capacity allocation but not the presumptive capacity allocation being dependent upon a reported channel quality indicator for the high-speed downlink shared channel for the target cell.

15. The method of claim 14, further comprising reducing a control node bitrate transmission gap which otherwise would occur had the control node waited to send the high-speed downlink shared channel (HS-DSCH) data frames after the control node had been informed of the calculated capacity allocation.

16. The method of claim 14, further comprising sending the high-speed downlink shared channel (HS-DSCH) data frames to the target radio base station prior to an activation time, the activation time being a time in the cell change procedure at which the cell change procedure becomes effective on an air interface between the target radio base station and the mobile terminal.

17. The method of claim 14, further comprising acquiring from the target radio base station the presumptive capacity allocation for the target cell, the presumptive capacity allocation being an initial carrier quality indicator sent from the target radio base station to the control node and configured to evoke transmission of a first high-speed downlink shared channel (HS-DSCH) data frame from the control node to the target radio base station.

18. The method of claim 14, further comprising acquiring from the target radio base station the presumptive capacity allocation for the target cell, the presumptive capacity allocation being related to an acceptable carrier quality indicator value at a cell border for the cell change.

19. The method of claim 14, further comprising, before knowing the calculated capacity allocation for the target cell and essentially at a switch time of a switch operation of the cell change procedure, the control node sending a first high-speed downlink shared channel (HS-DSCH) data frame to the target radio base station, the switch operation including a reallocation at the switch time, from the source radio base station to a target radio base station which serves a target cell, of the high-speed downlink shared channel (HS-DSCH) data frames destined for the mobile terminal.

20. The method of claim 14, further comprising:
 before a switch time of a switch operation of the cell change procedure, sending from the target radio base station to the control node the initial capacity allocation, the switch operation including a reallocation at the switch time from the source radio base station to the target radio base station of the high-speed downlink shared channel (HS-DSCH) data frames destined for the mobile terminal;
 essentially at the switch time, sending a first high-speed downlink shared channel (HS-DSCH) data frame from the control node to the target radio base station in response to the initial capacity allocation;
 upon receiving the first high-speed downlink shared channel (HS-DSCH) data frame from the control node, sending from the target radio base station to the control node a second capacity allocation, the second capacity allocation being a presumptive capacity allocation;
 upon receiving the second capacity allocation from the target radio base station, sending from the control node to the target radio base station further high-speed downlink shared channel (HS-DSCH) data frames, the further high-speed downlink shared channel (HS-DSCH) data frames being sent in accordance with the second capacity allocation;
 determining at the target radio base station a channel quality for the high-speed downlink shared channel utilized by the mobile terminal;
 using the channel quality to determine a third capacity allocation;
 sending the third capacity allocation from the target radio base station to the control node; and thereafter
 sending from the control node to the target radio base station yet further high-speed downlink shared channel (HS-DSCH) data frames, the yet further high-speed downlink shared channel (HS-DSCH) data frames being sent in accordance with the third capacity allocation.

21. The method of claim 20, wherein the second capacity allocation is a cell-change capacity allocation which is related to an acceptable carrier quality indicator value at a cell border for the cell change.

22. A method of operating a telecommunications system to perform a cell change procedure, the telecommunications system comprising a control node which controls plural radio base stations including a source radio base station and a target radio base station, the method comprising:
 sending high-speed downlink shared channel (HS-DSCH) data frames from the control node to the source radio base station for transmission to a mobile terminal in a source cell before the cell change procedure;
 the control node determining an activation time at which the source radio base station stops its transmission to the mobile terminal and the target radio base station starts its transmissions to the mobile terminal;
 the source radio base station, knowing the activation time, signaling to the control node before the activation time that receipt of more data frames on the high-speed downlink shared channel (HS-DSCH) risks queued data on the high-speed downlink shared channel (HS-DSCH) not being transmitted from the source radio base station to the mobile terminal before the activation time;
 the control node decreasing its sending of high-speed downlink shared channel (HS-DSCH) data frames to the source radio base station in accordance with the signaling;
 and then, during the cell change procedure,
 at a switch time the control node beginning to send the high-speed downlink shared channel (HS-DSCH) data frames which have not been sent to the source radio base station to the target radio base station which serves a target cell before the control node knows a calculated capacity allocation for the target cell, the switch time being earlier than the activation time, the calculated capacity allocation being dependent upon a reported channel quality indicator for the high-speed downlink shared channel for the target cell.

23. The method of claim 22, further comprising sending, earlier than the switch time, a capacity allocation control frame comprising the signaling.

* * * * *